United States Patent

[11] 3,587,772

| [72] | Inventor | Andre Louis Jaumotte<br>Avenue F. D. Roosevelt, 50, Brussels, Belgium |
|---|---|---|
| [21] | Appl. No. | 771,097 |
| [22] | Filed | Oct. 28, 1968 |
| [45] | Patented | June 28, 1971 |
| [32] | Priority | Nov. 17, 1967 |
| [33] | | Belgium |
| [31] | | 51,009 |

[54] AIR-CUSHION VEHICLE
2 Claims, 4 Drawing Figs.

[52] U.S. Cl. ................................... 180/121, 180/129
[51] Int. Cl. ..................................... B60v 1/00
[50] Field of Search ........................... 180/118, 121, 122, 127, 129

[56] References Cited
UNITED STATES PATENTS

| 3,039,550 | 6/1962 | Beardsley | 180/129 |
| 3,240,283 | 3/1966 | Jones | 180/129X |
| 3,244,248 | 4/1966 | Prickett | 180/127 |
| 3,279,416 | 10/1966 | Cockerell | 180/127X |
| 3,291,236 | 12/1966 | Foshag et al. | 180/121 |
| 3,371,738 | 3/1968 | Bertin | 180/121X |
| 3,388,766 | 6/1968 | Bertin | 180/121X |

FOREIGN PATENTS

| 1,380,143 | 10/1964 | France | 180/121 |

*Primary Examiner*—A. Harry Levy
*Attorney*—Young and Thompson

ABSTRACT: The invention relates to an air-cushion vehicle comprising at least two peripheral air-blasting lift devices. Said air-blasting lift devices comprise each a peripheral channel directed to the ground, and are surrounded by a bell-ended element which has its concavity directed to the ground. The distance from the lower edge of the bell-ended element to the ground is less than that between the lower edges of the peripheral air-blasting lift devices on the ground. Said bell-ended element is intended to receive air issuing from the aforesaid peripheral channels.

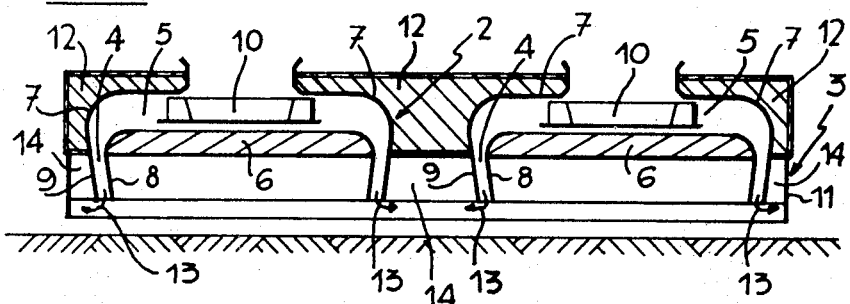
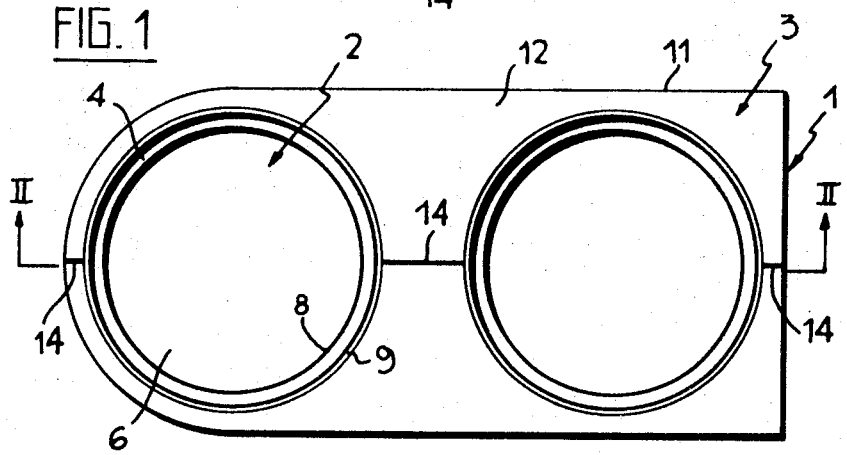
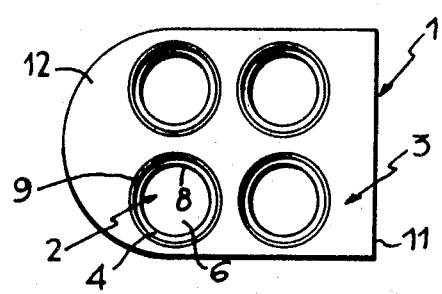
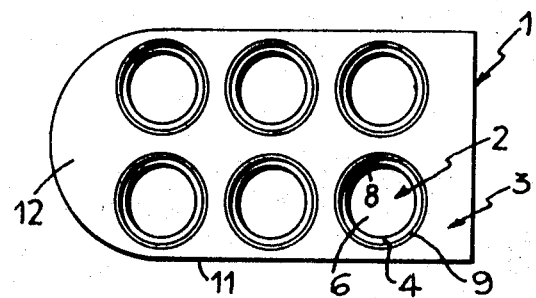
INVENTOR
ANDRÉ LOUIS JAUMOTTE
BY Young + Thompson
ATTYS.

AIR-CUSHION VEHICLE

The present invention relates to an air-cushion vehicle or ground-effect machine.

Known air-cushion vehicles comprise a peripheral air-blasting lift device. Such known vehicles will be designated hereafter as "peripheral air-blasting vehicles." The said air-blasting lift device comprises a peripheral channel directed to the ground and positioned substantially at the periphery of the vehicle, in the vicinity of the ground. The word "ground" as used in the present specification, must be taken in a general sense as designating both land and water surfaces.

The aforementioned peripheral channel is fed with air under pressure from at least one fan that intakes ambient air and forces it back generally into an internal distribution chamber. Said chamber communicates with the peripheral channel and ensures a substantially uniform distribution of the airflow within the peripheral channel. Said chamber extends practically over the whole surface of the vehicle.

At the exit of the peripheral channel, the airblast is incurved as a result of its impingement on the ground, which is close thereto, and escapes outside. The incurvation of the blast generates a vis inertiae which is distributed over the whole periphery of the lower part of the vehicle, and which is balanced by the overpressure that is prevailing in the air-cushion present under the aforesaid lower part.

The lower part of the peripheral channel walls is generally made flexible. Said flexible part is generally called a "skirt."

These known air-cushion vehicles present many drawbacks, the more important of which being doubtless an intrinsic instability of the vehicle when exposed to rolling and pitching.

Above mentioned air-cushion vehicles, when provided with skirts, are sometimes caused to overturn when said skirts encounter obstacles. These overturns are attributable, amongst others, to a lack of flexibility of the skirts, due to the fact that they are stiffened by the pressure of the peripheral airblast.

The construction of these known peripheral air-blasting vehicles is relatively complicated for the following reasons:

the peripheral airblast has to present an angle of convergence, which complicates the shape of joining elbows between the internal distribution chamber and the peripheral channel;

the presence of the internal distribution chamber renders the structure complicated and heavier;

the double skirts of the peripheral airblast vehicles are of relatively intricate construction.

It is within the scope of the present invention to remedy these drawbacks. To this end, the air-cushion vehicle according to the present invention comprises at least two peripheral air-blasting lift devices known per se, each of them comprising a peripheral channel directed to the ground. These peripheral air-blasting lift devices are surrounded by a bell-ended element which has its concavity directed to the ground and which receives air exiting from the aforesaid peripheral channels. The distance between the lower edge of the bell-ended element and the ground is less than that between the lower edges of the peripheral air-blasting lift devices and the ground.

In the vehicle according to the invention, the lifting air-cushion is produced under the lower part of said vehicle by the successive two-stage lifting action of air under pressure. The first lifting stage comprises the peripheral air-blasting lift devices, whereas the second lifting stage is provided by the bell-ended element. The latter is generally defined laterally by a substantially vertical wall, secured to the periphery of the vehicle. Said wall is generally flexible.

The air-cushion vehicle according to the present invention offers numerous advantages.

Amongst them, the following are to be noted: an excellent stability in the case of pitching as soon as two peripheral air-blasting lift devices are positioned in line longitudinally of the vehicle, and in the case of rolling, as soon as two of such devices are positioned side by side transversely of the vehicle. If necessary, a vehicle provided only with two peripheral air-blasting lift devices, positioned in line along the longitudinal axis of said vehicle is still relatively stable in the case of rolling, said stability being easy to improve by means of longitudinal vertical walls positioned within the bell-ended element and along the longitudinal axis of the vehicle. These flexible walls partition the air-cushion and ensure a uniform distribution of the pressure by impeding transverse flow of air.

On the other hand, the risk of overturning of the vehicle according to the present invention, wherein the sidewall of the bell-ended element is flexible, is very limited. This interesting feature is due, amongst others, to the fact that the pressure in the bell-ended element, which pressure tends to force said flexible wall against an obstacle, is weaker than the pressure of the peripheral airblast which acts in the case of a known peripheral air-blasting vehicle. Furthermore, the sidewall of the bell-ended element has a less intricate shape than the double-walls of the peripheral channels of these known vehicles. Due to this, said sidewall is more flexible, all other conditions remaining equal; it can thus be more easily deformed than these latter when encountering an obstacle.

Finally, all other conditions remaining equal, the vehicle according to the present invention is simpler in construction than the known peripheral air-blasting vehicles:

the internal distribution chamber, which covers substantially the whole surface of the known peripheral air-blasting vehicle is omitted. Each peripheral air-blasting lift device has its own internal distribution chamber, the dimensions of which are smaller and the shape of which is simpler. This positioning becomes particularly simple and advantageous when the peripheral air-blasting lift devices are circular and when each of them has its own centrifugal or helico-centrifugal fan located at the center of the distribution chamber. The latter constitutes at the same time the diffuser of the fan:

furthermore, due to the fact that the peripheral channel is substantially vertical, the shape of the elbow joining the distribution chamber is simplified. An assembly giving very high internal yield is thus provided and, due to the symmetry of revolution, a uniform distribution of the airflow is obtained;

in the case of circular peripheral air-blasting lift devices the skirts are of developable conical shape, thus of a much simpler shape than the double skirts of the known peripheral air-blasting vehicles;

it is possible to produce standardized peripheral air-blasting lift devices which, when provided in a more and more important number within a single bell-ended element, allow producing wider and heavier vehicles;

the external skirt, which is a simple one, is far less intricate than the double peripheral skirts of the known peripheral air-blasting vehicles; as it is longer than those of the peripheral air-blasting lift devices, it is the sole element of the construction exposed to wear, wear of the skirts being an important factor in the economy of exploitation of an air-cushion vehicle.

Further features and details of the present invention will appear in the following description of three embodiments of the air-cushion vehicle according to the present invention. Said description is to be considered as illustrative only and does not limit the scope of the invention. It is given with reference to the accompanying drawing in which:

FIG. 1 shows as viewed from the bottom, a first embodiment of the vehicle of the present invention;

FIG. 2 is a schematic section along the line II–II of FIG. 1;

FIG. 3 shows as viewed from the bottom, a second embodiment of the vehicle of the present invention, and FIG. 4 shows, as viewed from the bottom, a third embodiment of the vehicle of the present invention.

The air-cushion vehicle 1 as represented in FIGS. 1 and 2 comprises essentially two peripheral air-blasting lift devices such as 2 which are surrounded by a bell-ended element 3, having its concavity directed to the ground.

The peripheral air-blasting lift devices 2 are circular in configuration, each of them comprising:

a peripheral channel 4 directed to the ground and an internal distribution chamber 5 which are defined by a base plate 6 and a cowl 7. The underpart of the walls of the peripheral channel 4 is generally flexible and is formed, to this end, by flexible skirts 8 and 9 in order to allow the vehicle to move at low altitude above the ground level. These flexible skirts 8 and 9 are substantially vertical and substantially frustoconical in shape;

an independent air-feed system which is comprised here by a helico-centrifugal fan 10, the rotation axis of which coincides with the symmetry axis of the lift device. Cowl 7 and base plate 6 form simultaneously the entrance opening, the diffuser of the fan and the elbow of the peripheral channel.

The bell-ended element 3 that surrounds both aforesaid lift devices 2 is laterally defined by a single vertical skirt 11 mounted at the periphery of vehicle structure 12. Said sidewall 11 is of such a length that the distance between its lower edge and the ground is less than the distance between the lower edge of skirts 8 and 9 and the ground.

The airblasts issuing from the peripheral channels 4, represented here by arrows 13, maintain a pressurized air-cushion under base plate 6 of each of lift devices 2, on the one hand, and a pressurized air-cushion within the bell-ended element itself, on the other hand. The relation between the effective pressure of air under the base plates 6 of the lift devices 2 and the effective pressure of air under the bell-ended element 3 itself ranges about 1.25 to 1.50.

For increasing the stability of the vehicle against rolling, it is advantageous to provide vertical walls 14 within the bell-ended element 3 along the longitudinal axis of the vehicle. The function of these vertical walls 14 is to make the pressure uniform within the bell-ended element by impeding transverse flow of air.

In a second particularly advantageous embodiment, illustrated by FIG. 3, the vehicle according to the invention comprises four peripheral air-blasting lift devices 2, uniformly distributed over the whole vehicle and surrounded by a bell-ended element 3. Said four lift devices 2 are fed with air under pressure, preferably independently from one another.

In a third embodiment illustrated by FIG. 4, related to a wide craft, the vehicle according to the invention comprises six peripheral air-blasting lift devices 2 which are distributed over the whole vehicle and surrounded by a bell-ended element 3. These lift devices 2 are disposed in two symmetrical rows in relation to the axis of said vehicle.

Similar peripheral air-blasting lift devices may thus be used in the three described embodiments.

A particularly advantageous solution consists in providing a standardized assembly comprising two peripheral air-blasting lift devices provided with their own fan, said two devices being rendered interdependent by a structure supporting an engine driving both fans. By coupling two such devices, a vehicle is obtained as illustrated in FIG. 3; by coupling three such devices, a vehicle is obtained as seen in FIG. 4.

The air-cushion vehicles according to these second and third embodiments of the present invention present excellent properties of stability against pitching and rolling.

The present invention is not limited to the described embodiments as a number of variations may be made as regards the shape, location and construction of certain members without departing from the scope of the invention.

I claim:

1. An air-cushion vehicle, comprising at least two peripheral air-blasting lift devices comprising each a peripheral channel directed to the ground, the said peripheral channels being external to one another and being connected to at least one air supply for providing a first lifting air pressure stage under each air-blasting lift device, the said vehicle comprising further a bell-ended element surrounding all the said peripheral air-blasting lift devices and having its concavity directed to the ground for providing a cavity around all the peripheral channels, this cavity being adapted for receiving air issuing from the aforesaid peripheral channels and for providing a second lifting air pressure stage, the distance from the lower edge of the bell-ended element to the ground being less than the distance between the lower edges of the peripheral air-blasting lift devices and the ground, the peripheral air-blasting lift devices being in line along the axis of the vehicle, and vertical walls positioned within the bell-ended element along the axis of the vehicle, said vertical walls making the pressure uniform within the bell-ended element by impeding transverse flow of air.

2. An air-cushion vehicle, comprising a base plate and at least two peripheral air-blasting lift devices comprising each a pair of concentric skirts depending below said base plate and terminating at the same horizontal level and defining between them a peripheral channel directed to the ground, the said peripheral channels being external to one another and being connected to at least one air supply for providing a first lifting air pressure stage under each air-blasting lift device, the said vehicle comprising further a bell-ended element surrounding all the said peripheral air-blasting lift devices and having its concavity directed to the ground for providing a cavity around all the peripheral channels, this cavity being adapted for receiving air issuing from the aforesaid peripheral channels and for providing a second lifting air pressure stage, the distance from the lower edge of the bell-ended element to the ground being less than the distance between the lower edges of said skirts and the ground.